United States Patent [19]

Webb et al.

[11] 3,716,859
[45] Feb. 13, 1973

[54] TIME MULTIPLEXER FOR HIGH PRF PULSE DOPPLER RADAR

[75] Inventors: William R. Webb, Catonsville, William S. Jones, Baltimore; Robert E. Hendrix, Annapolis, all of Md. 21401

[73] Assignee: Westinghouse Electric Corporation, Pittsburgh, Pa.

[22] Filed: Oct. 27, 1970

[21] Appl. No.: 84,304

[52] U.S. Cl. ........................................343/7.7, 343/8
[51] Int. Cl. ..............................................G01s 9/42
[58] Field of Search.........................343/7.7, 8, 5 DP

[56] References Cited

UNITED STATES PATENTS

| | | |
|---|---|---|
| 3,404,399 | 10/1968 | Eschner, Jr............................343/7.7 |
| 3,560,972 | 2/1971 | Taylor, Jr................................343/7.7 |
| 3,611,375 | 10/1971 | Chambers et al.......................343/7.7 |

*Primary Examiner*—Samuel Feinberg
*Assistant Examiner*—G. E. Montone
*Attorney*—F. H. Henson and E. P. Klipfel

[57] ABSTRACT

A digital time multiplexer for use in combination with a high PRF range gated pulse doppler radar which eliminates the need for a doppler filter bank for each range gated receiver in the system. The outputs of n range gated receivers are respectively sampled at the Nyquist rate or faster, converted into a digital signal, and fed into a memory unit on a time shared basis. The data is then sequentially read out of the storage on a per receiver basis into a single doppler filter bank for spectral analysis of the doppler band.

10 Claims, 2 Drawing Figures

TIME MULTIPLEXER FOR HIGH PRF PULSE DOPPLER RADAR

BACKGROUND OF THE INVENTION

Field of the Invention

This invention relates generally to radar systems, and more particularly to data processing apparatus utilized in pulse doppler radars. Whereas conventional high PRF pulse doppler radar requires a doppler filter bank for each range gated receiver channel, the present invention has for its object the reduction in circuitry required to implement a pulse doppler radar by digitally time multiplexing the outputs of a plurality of range gated receivers into a single doppler filter bank.

SUMMARY

Briefly, the subject invention is directed to a time multiplexer for a high PRF pulse doppler radar and comprises, inter alia, means for sampling the output of $n$ range gated receivers, each of which has a CW signal appearing at its output for a duration commensurate with the reception time allocated to each of a plurality of transmitted pulse repetition frequencies (PRF's). The output of all the range gated receivers are sampled at the Nyquist rate or faster by means of a sampling unit controlled by a synchronizer. The analog samples are fed from the sampler unit on $m$ output lines to respective analog-to-digital converters. Each of the analog-to-digital converters change the analog sample fed thereto into a digital word having a number of bits required to reproduce the expected dynamic range of each sample signal. The digital outputs are then gated on a time sharing basis into a memory comprised of two separate memory units. Both memory units are controlled by the synchronizer to provide a storage sequence such that the digital words associated with each receiver channel are grouped for subsequent readout. One memory unit has data stored into it from the reception interval of one PRF interval while simultaneously the other memory unit is read out of data previously stored from a preceding PRF interval. As the data is read out from each memory unit, it is converted back into analog form and restored to a CW signal. The sequence is controlled by means of the synchronizer unit driving a memory select switch so that the data from all of the n receiver channels are sequentially read into a single doppler filter bank.

DESCRIPTION OF THE PREFERRED EMBODIMENT

Figure 1:
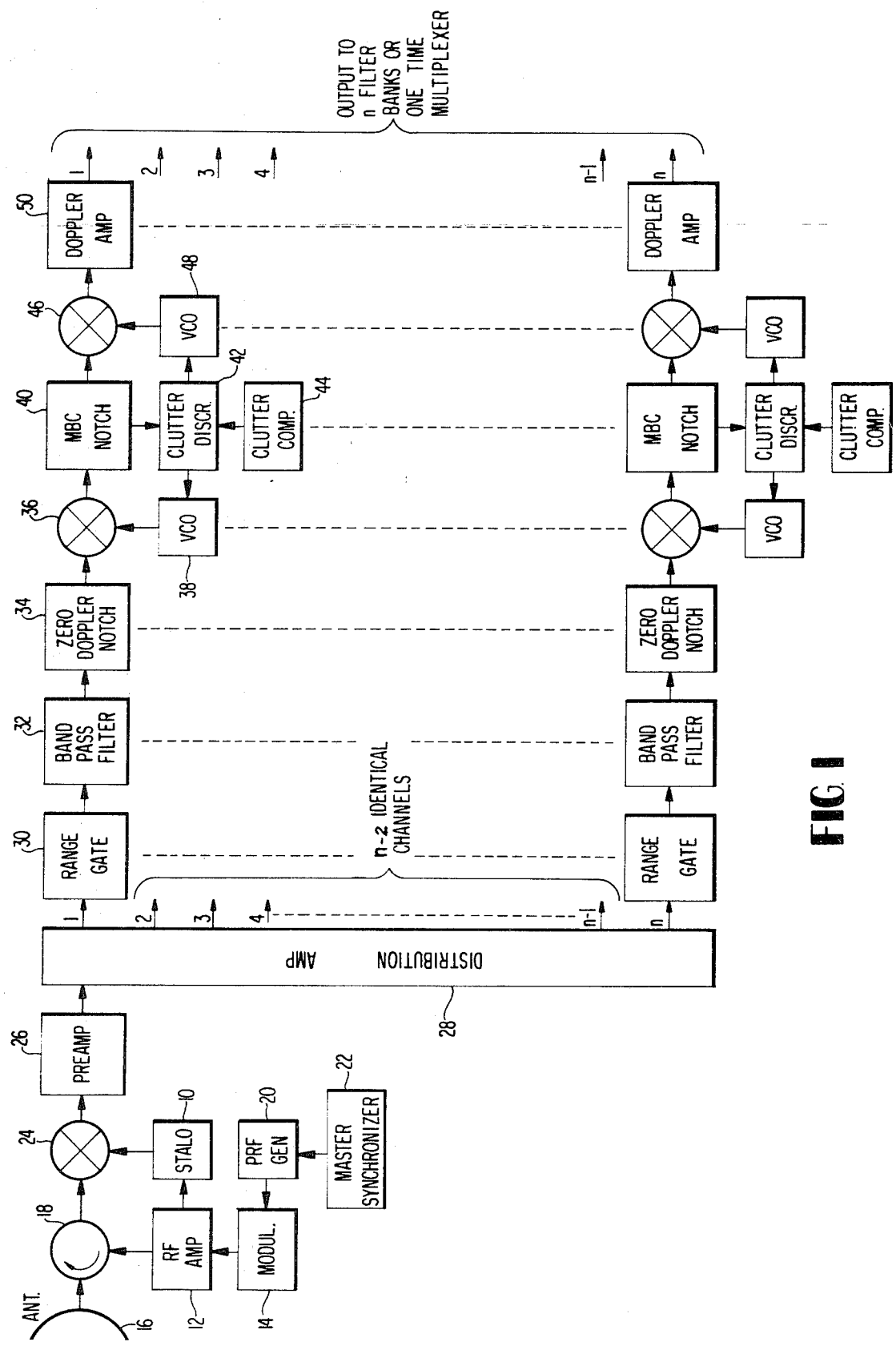
FIG. 1 is a partial block diagram of a pulse doppler radar having a plurality of identical range gated receiver channels.

The type of pulse doppler radar to which the subject invention may be applied is shown in FIG. 1. In such a system the microwave carrier frequency energy is generated in a stable local oscillator 10 where it is then coupled into a high gain RF amplifier 12. The RF amplifier 12 is modulated, that is gated, by means of a modulator circuit 14 to produce a pulse train of RF pulses at a high PRF which is then coupled to an antenna 16 through a circulator device 18. The frequency of the PRF is varied in a predetermined manner over a selected time interval by means of a PRF generator 20 coupled to the modulator 14. The PRF's have a predetermined value so as to be larger than the maximum expected doppler return signal from the target and the vehicle carrying the radar combined. This requirement results in PRF's being in the KHz range. The unambiguous range for PRF's of this magnitude is very short compared to the desired range of interest. Therefore, to obtain range data, the variable PRF generator 20 is adapted to produce multiple PRFs sequentially by means of a master synchronizer 22 for a predetermined time corresponding to the dwell time of the antenna 16 on a target of interest. The position of the target return with respect to the transmit pulse is noted in the receiver for each PRF and this information is used to determine unambiguous target range. The duty cycle of the multiple PRF radar pulses transmitted is determined by the range of interest, the maximum doppler, and the desired range accuracy.

Upon reception, the pulsed energy reflected from the target is received by the antenna 16 and coupled to a mixer 24 by means of the circulator 18 where it is heterodyned to a first IF frequency which is then amplified by means of a preamplifier circuit 26. The amplified IF output from the preamplifier 26 is then coupled to a distribution amplifier 28 providing $n$ outputs which are respectively coupled to $n$ channels of range gated receivers. The number n is determined by the minimum PRF and the desired pulse-width and it is expressed by the equation, $$n = (1/\text{PRF} \times \text{pulsewidth}) - 1.$$

Each channel includes a range gating circuit which upon command from the master synchronizer 22 passes an input into the receiver channel. The master synchronizer turns the range gate on at a rate equal to the PRF and for a period of time equal to the pulsewidth. The range gates are turned on sequentially through the interpulse period so that the entire period is covered. The output of the range gate circuit 30 then is coupled to a relatively narrow bandpass filter 32 which is designed to pass the entire doppler spectrum of interest for that channel. Next a band rejection filter 34 referred to as a zero doppler notch filter receives the output of the bandpass filter 32 which has for its purpose the exclusion of the altitude line clutter from the received signal. The output of the band rejection filter 34 is fed into a second mixer which also receives an input from a voltage controlled oscillator 38 whereupon a second IF signal is produced at the output of the mixer 36. The main beam clutter in the second IF signal is tracked and rejected from the system by means of a main beam clutter band rejection filter 40, a clutter discriminator 42 and a clutter position computing circuit 44 coupled back to the VCO 38. The output of the main beam clutter band rejection filter is fed into a third mixer 46 which also receives an input from the second voltage controlled oscillator 48. The output of the third mixer 46 is fed into a doppler amplifier 50 providing an output CW signal containing all of the doppler frequencies in the desired band excluding the altitude line and main beam clutter. Furthermore, $n$ outputs exist simultaneously. Normally, the $n$ CW outputs from the *n* doppler amplifiers 50 are coupled into *n* doppler filter banks (one for each range gate) for the required spectral analysis of the doppler band. A pulse doppler radar of this type is well known to those skilled in the art, being shown and described, for example, in greater detail in the *Radar Handbook*; Merrill I. Skolnik; McGraw-Hill Book Company, 1970, Chapter 19, entitled "Pulse Doppler Radar."

Figure 2:
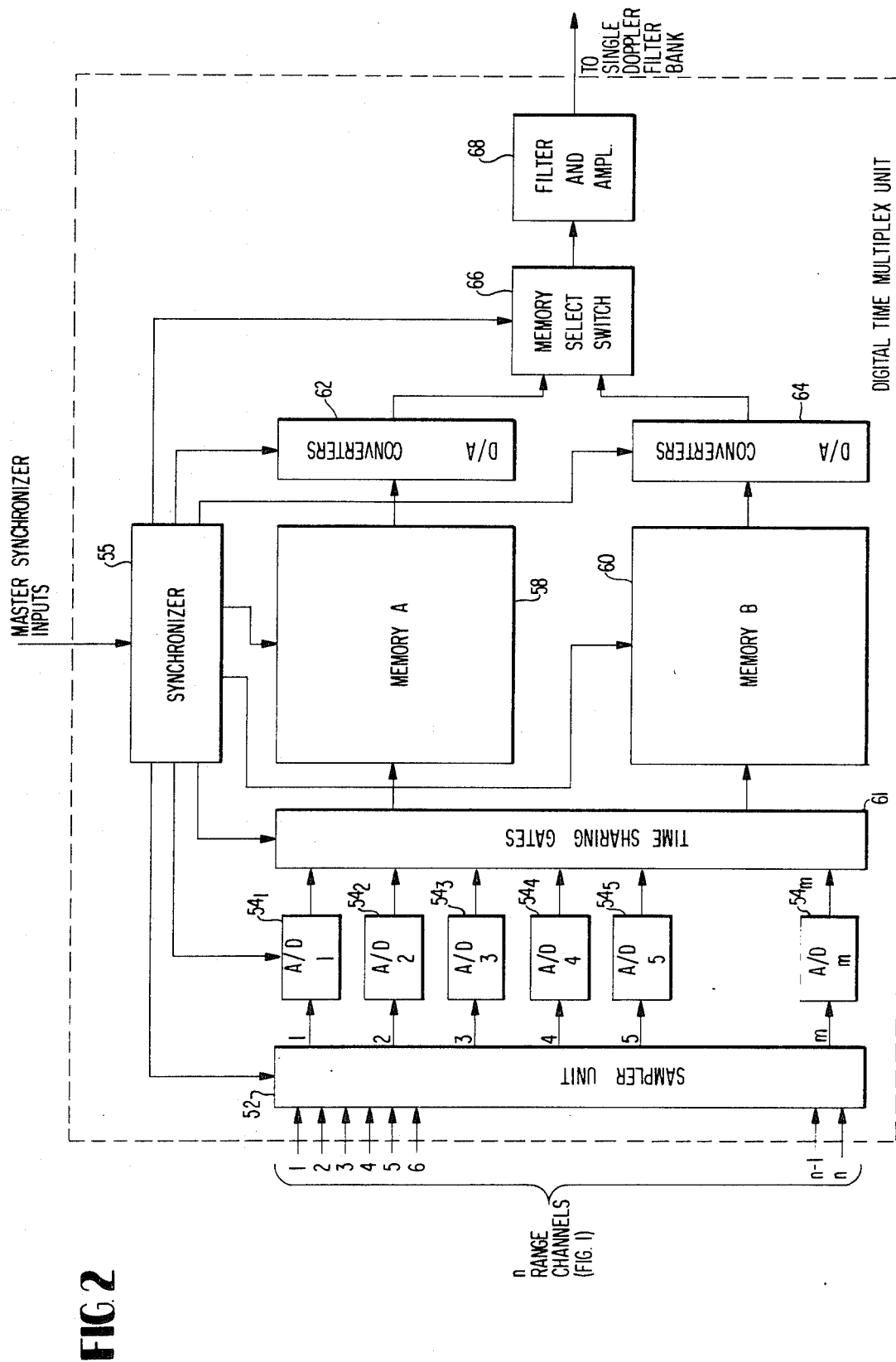
FIG. 2 is a block diagram illustrative of the preferred embodiment of the subject invention.

The present invention has for its object the elimination of the need for all but one doppler filter bank. Reference now is made to FIG. 2 which discloses in block diagrammatic form means for digitally time multiplexing the output of the *n* receiver channels, each of which has a CW signal appearing at the output of the respective doppler amplifier 50 and having a duration commensurate with the reception time allocated to each of the transmitted PRF's. The sampled outputs of all *n* receivers are simultaneously fed into a sampler unit 52 which is controlled by means of a synchronizer 55 which is adapted to provide sampling at the Nyquist rate or faster. The output of the sampler unit 52 comprises *m* signal lines which are coupled to respective analog-to-digital (A/D) converters $54_1, 54_2, \ldots 54_m$. The number *m* of A/D converters is determined by the sampling rate and the maximum speed of operation of the A/D converters themselves. Each A/D converter $54_1$, etc., is operated in accordance with a timing signal supplied from the synchronizer 55 and operates to change the respective analog CW sample applied thereto to a digital word having a predetermined number of bits necessary to reproduce the expected dynamic range of the sample signal. The digital outputs of the A/D converters $54_1 \ldots 54_m$ are then selectively stored in a digital memory 56 comprised of two memory units 58 and 60 by means of a multiplexer or a time sharing circuit 61 which determines a storage sequence such that the digital words associated with each receiver channel are grouped for subsequent readout. Two memory units 58 and 60 are required and many be of any conventional digital type. The memory units 58 and 60 are clocked by the synchronizer 55 to operate in mutually opposite modes, that is one is operating in a read-in mode while the other is operating in a read-out mode and vice versa. For example, where the memory unit 58 received all of the digital words corresponding to all of the receiver outputs of a previous PRF interval, in a subsequent PRF interval, memory unit 58 will switch into a read-out mode while the other unit 60 operates to read-in the new digital information. It is conceivable, however, that a ripple mode could be mechanized such that just as soon as any word is read out of one unit it is immediately fed a new word and both units therefore operate in an intermix fashion.

Moreover, on read-out the sequence is such that the digital words from each channel are read out sequentially and are converted by respective digital-to-analog D/A converters 62 and 64 which provide a plurality of sequential analog signals as opposed to a plurality of simultaneous analog signals appearing at the output of the end receiver channels. A memory select switch 66 under the operation of the synchronizer 55 is coupled to the D/A converters 62 and 64 in order to gate out the proper analog signals from the memory unit 58 and 60 whichever is presently operating in the read-out mode. By coupling a suitable filter and amplifier circuit 68 to the output of the memory select switch 66, all of the CW signals are restored which when fed to a single doppler filter will provide the necessary doppler signal analysis. All that has effectively changed is the delay of one PRF interval for the analysis of the pulsed doppler radar signal.

What has been shown and described, therefore, is a digital time multiplex unit wherein the outputs of all of the receiver channels are sequentially sampled and stored in digital form in turn until all samples from all receivers are stored. This process takes a total time T, the interval of PRF duration. Therefore in the time T all *n* receiver channels will have been sampled and the data stored in the memory. Moreover, the data is ordered into the storage media by means of the time sharing circuit such that the data is accessible for read-out on a per receiver basis. The data is read out of the memory on a receiver basis, reading all digital samples of a single receiver before going to the next receiver. This provides a readout which is basically orthogonal to the writing process. The result is that the time required to write the CW analog receiver samples into storage for the n range gated receiver channels was T. The read-out time, however, corresponding to one receiver channel is a maximum of T/*n*. Therefore this process has produced a time speed up through the system. The minimum time multiplication is *n*. This results in multiplying all frequencies by the same factor such that the bandwidth is now a minimum of *n* times the original. It is this fact which permits the use of a single doppler filter bank. With bandwidth multiplication the doppler bandwidth of each filter element in the doppler filter bank must be multiplied by the same factor. Therefore for any conventional bandwidth the multiplied bandwidth will permit the new filter to build up to a threshold in a time which is 1/*n* of the conventional filter. Thus the *n* receiver channels may be sequentially examined by the filter bank at the same time as the non-multiplexed filter banks.

Having described the present invention with that is at present considered to be the preferred embodiment thereof.

We claim as our invention:

1. A digital time multiplexer for converting a plurality of pulse doppler radar receiver output CW signals which appear simultaneously in a pulse doppler radar system into a corresponding plurality of sequential signals for analysis by a single doppler filter bank, comprising, in combination:

a synchronizer circuit providing outputs comprising time related control signals;

circuits means coupled to and operated by said synchronizer for selectively sampling all of said plurality of CW signals;

a plurality of signal output lines coupled from said circuit means;

first signal converter means coupled to each of said plurality of signal output lines generating a digital representation of the respective CW signal appearing on said plurality of output lines;

a digital memory coupled to and operated by said synchronizer and adapted to temporarily store said digital representations in a predetermined order;

a multiplexer circuit coupled between said first signal converter means and said memory and operated by said synchronizer for selectively coupling said digital representations into said memory on a time shared basis, said synchronizer then effecting a predetermined sequential read-out of said digital representations;

second signal converter means coupled to said memory for reconverting said digital representations in sequential timed relationship into reconstructed representations of said receiver output CW signals; and means coupling said second signal converter means to said doppler filter bank wherein said reconstructed output CW signals appearing in sequential timed relation are fed thereto for spectral analysis of the doppler band.

2. The invention as defined by claim 1 wherein said first signal converter means comprises analog-to-digital converter means.

3. The invention as defined by claim 2 wherein said second signal converter means comprises digital-to-analog converter means.

4. The invention as defined by claim 3 wherein said digital memory comprises a first and a second memory unit, and wherein one memory unit is operable to have digital data read into it during one time interval and the other memory unit is operable to read out data during said time interval of data stored during a previous time interval.

5. The invention as defined by claim 4 wherein said second signal conversion means comprises a first and a second digital-to-analog converter respectively coupled to said first and second memory unit.

6. The invention as defined by claim 5 and wherein said means coupling said first and second digital-to-analog converters to said doppler filter bank includes switch means coupled between the respective outputs of said first and second digital-to-analog converter and said doppler filter bank, said switch means being operated by a control signal applied from said synchronizer circuit for coupling reconstructed representations of said CW signals from said first and second digital-to-analog converters to said doppler filter bank during the respective read-out time interval of said first and second memory unit.

7. The invention as defined by claim 6 and additionally including filter and amplifier means coupled between said switch means and said doppler filter bank.

8. The invention as defined by claim 1 wherein said first signal converter means comprises m analog-to-digital converters for n radar receiver channels, where m is determined by the sampling rate of said circuit means and the maximum operating speed of said analog-to-digital converters and n is determined by the minimum PRF of said pulse doppler radar system and the pulse width of the radiated radar signals.

9. The invention as defined by claim 8 wherein said pulsed doppler radar system additionally includes means for transmitting a plurality of PRFs sequentially.

10. The invention as defined in claim 8 wherein said circuit means selectively samples all of said radar receiver output CW signals at least at the Nyquist rate.

* * * * *